Dec. 15 1925.         1,566,172
R. J. STOKES
PULLEY
Filed Nov. 23, 1922

Inventor:-
Robert J. Stokes
by his Attorneys

Patented Dec. 15, 1925.

1,566,172

UNITED STATES PATENT OFFICE.

ROBERT J. STOKES, OF PRINCETON, NEW JERSEY, ASSIGNOR TO THERMOID RUBBER COMPANY, OF HAMILTON TOWNSHIP, NEW JERSEY, A CORPORATION OF NEW JERSEY.

PULLEY.

Application filed November 23, 1922. Serial No. 602,833.

*To all whom it may concern:*

Be it known that I, ROBERT J. STOKES, a citizen of the United States, residing in Princeton, Mercer County, New Jersey, have invented certain Improvements in Pulleys, of which the following is a specification.

One object of my invention is to make a pulley, which will be substantial, and which will have a high co-efficient of friction.

A further object of the invention is to make a pulley of a composition of asbestos fibre with a binder, molded under pressure and vulcanized.

Figure 1:
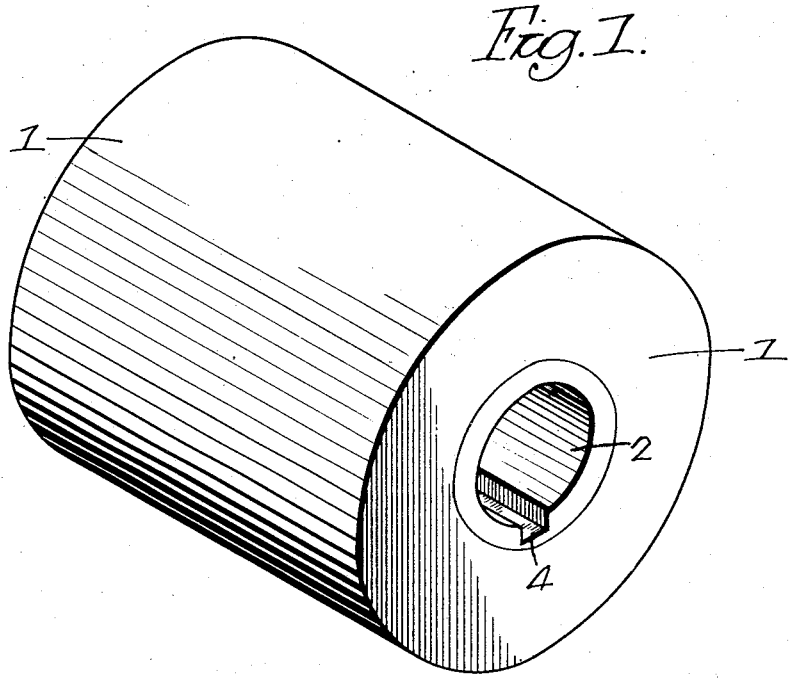
Fig. 1 is a perspective view of my improved pulley.

In manufacturing my improved pulley, I utilize the waste from brake linings and similar manufactured articles, which consists of asbestos fibre, cotton fabric and rubber, or a resinous binder, and, in many instances, pieces of fine wire. This material is ground into a fine pulp and an additional binder of rubber, or resin may be added, if found desirable. The mass is placed in a mold of suitable shape and vulcanized under considerable pressure, producing a form such as shown in Fig. 1, which represents a solid pulley to be used on electric motors and other equipment.

Figure 2:
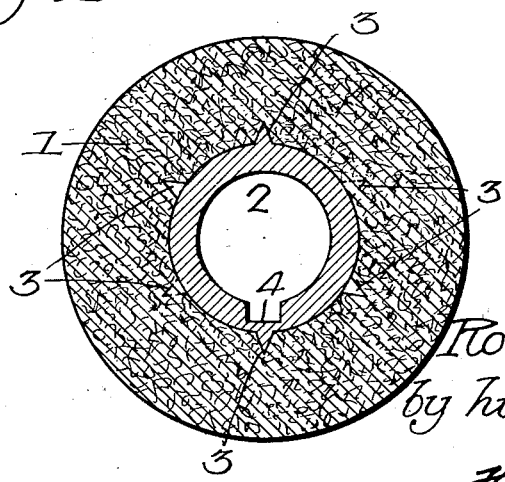
Fig. 2 is a sectional view of the pulley.

Referring to the drawing, 1 is the body of the pulley made of the above mentioned composition. 2 is a core, which is located in the body 1, prior to vulcanization. On the core are projections 3, which are embedded in the material of the body 1, as shown in Fig. 2. The core has a key-way 4 to receive a key by which the pulley is held from turning on the shaft.

In some instances, the core may have a smooth, or shaped, outer surface and may be forced into the body 1 before or after vulcanization.

The composition of ground asbestos fibre and a binder with, or without, the cotton fibre, produces a pulley that has great strength and durability, also a high co-efficient of friction, which insures a good adhesion to the driving belt.

By grinding the waste material into a fine pulp, the vulcanizable binder penetrates the mass so that, when the pulley is molded under pressure and vulcanized, the fibres are held firmly.

I preferably use a greater proportion of asbestos fibre than cotton fibre, and, in many instances, I may use a composition, in which fine wires form part of the composition, although the wires may be omitted without departing from the essential features of the invention.

I claim:

A pulley consisting of finely divided ground asbestos fibres, cotton fibres, fine wires, and a rubber binder, molded into shape and vulcanized under pressure.

ROBERT J. STOKES.